(12) United States Patent
Liu

(10) Patent No.: US 11,607,299 B1
(45) Date of Patent: Mar. 21, 2023

(54) ELECTRIC TOOTHBRUSH REPLACEMENT HEAD

(71) Applicant: Guangdong Meihong Dental Technology Co., Ltd., Shenzhen (CN)

(72) Inventor: Yafei Liu, Maoming (CN)

(73) Assignee: GUANGDONG MEIHONG DENTAL TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/940,466

(22) Filed: Sep. 8, 2022

(51) Int. Cl.
| | |
|---|---|
| *A61C 17/22* | (2006.01) |
| *A46B 5/00* | (2006.01) |
| *A46B 9/04* | (2006.01) |
| *A46B 13/02* | (2006.01) |

(52) U.S. Cl.
CPC .......... *A61C 17/222* (2013.01); *A46B 5/0095* (2013.01); *A46B 9/04* (2013.01); *A46B 13/02* (2013.01)

(58) Field of Classification Search
CPC ............................ A61C 17/222; A46B 5/0095
See application file for complete search history.

(56) References Cited

U.S. PATENT DOCUMENTS 7,690,067 B2 * 4/2010 Schaefer .............. A61C 17/222
  15/22.1
9,795,465 B2 * 10/2017 Fattori ................. A61C 17/222

\* cited by examiner

*Primary Examiner* — Laura C Guidotti
(74) *Attorney, Agent, or Firm* — WPAT, PC

(57) ABSTRACT

An electric toothbrush replacement head is provided and includes a replacement head handle; an opening disposed on an end of the replacement head handle; a transmission connecting part disposed in the opening; at least one through-groove disposed on an edge of the transmission connecting part; a transmission directional elongated groove disposed in the transmission connecting part; reinforced ribs disposed between the transmission connecting part and a portion where the replacement head handle is provided with the opening. The electric toothbrush replacement head with a reasonable structure is easy to replace and stable for using. Furthermore, the electric toothbrush replacement head is convenient, safe and reliable, which can also eliminate motor noise.

13 Claims, 4 Drawing Sheets

ELECTRIC TOOTHBRUSH REPLACEMENT HEAD

TECHNICAL FIELD

The disclosure relates to a field of electric toothbrush technologies, and more particularly to an electric toothbrush replacement head.

BACKGROUND

Electric toothbrushes are widely used because of a high efficiency, portability and a good cleaning effect. Most of the electric toothbrushes in current market vibrate through a rapid rotation of a motor, which in turn drives the electric toothbrush head to ensure the good cleaning effect. However, internal structures of the current electric toothbrushes are complex, too many assembly parts bring corresponding costs to production and processing, and a destruction rate of the whole electric toothbrush is high. In addition, the rapid rotation of the motor drives the electric toothbrush head to vibrate through a transmission assembly, therefore, unstable internal structure may cause damage to the internal structure, which affects a normal use of the electric toothbrush.

A manufacturing process of the electric toothbrush replacement head generally includes implanting bristles into a toothbrush plate, and then connecting the toothbrush plate with a toothbrush pole. The current electric toothbrush replacement head has an unreasonable structure and a short service life, which means that the replacement head needs to be replaced frequently, making it inconvenient for people to use the electric toothbrush. In addition, the vibration of the motor affects the normal use of the electric toothbrush.

SUMMARY

The disclosure mainly aims to provide an electric toothbrush replacement head with a reasonable structure, which is easy to replace, stable for using, able to eliminate motor noise, convenient, safe and reliable.

In order to achieve the above purposes, the disclosure provides an electric toothbrush replacement head, including a replacement head handle; an opening disposed on an end of the replacement head handle; a transmission connecting part disposed in the opening; at least one through-groove disposed on an edge of the transmission connecting part; a transmission directional elongated groove disposed in the transmission connecting part.

In an embodiment of the disclosure, the at least one through-groove includes two through-grooves.

In an embodiment of the disclosure, a length of each of the two through-grooves is at a range of 8.0 millimeters (mm) to 8.5 mm.

In an embodiment of the disclosure, at least one reinforced rib is provided between the transmission connecting part and a portion where the replacement head is provided with the opening.

In an embodiment of the disclosure, the at least one reinforced rib includes two reinforced ribs.

In an embodiment of the disclosure, the transmission directional elongated groove includes two layers of grooves, and the two layers of grooves include a first groove and a second groove. A length of the first groove is shorter than a length of the second groove, and the first groove is superimposed on the second groove.

In an embodiment of the disclosure, a third groove is disposed on the transmission directional elongated groove.

In an embodiment of the disclosure, the transmission connecting part is provided with a pressing platform faced to the transmission directional elongated groove.

In an embodiment of the disclosure, the pressing platform includes a space-keeping groove.

In an embodiment of the disclosure, a position of the space-keeping groove is at a range of 0.05 mm to 1 mm lower than a position of the pressing platform.

In an embodiment of the disclosure, the space-keeping groove includes a positioning groove.

In an embodiment of the disclosure, a thickness of the portion where the replacement head handle is provided with the opening is at a range of 1.0 mm to 1.2 mm.

Advantages of the disclosure are as follows. The electric toothbrush replacement head of the disclosure is designed with a reasonable structure and easy to replace, which can reduce components of the electric toothbrush replacement head, solve a power loss while a transmission shaft making a transmission movement, greatly reduce a vibration generated by a motor and eliminate noise. Therefore, the electric toothbrush is in a more stable use, greatly promote its cleaning effect and prolong its service life. The electric toothbrush replacement head of the disclosure is practical, safe and reliable, which is suitable for widely use.

BRIEF DESCRIPTION OF DRAWINGS

In order to explain the embodiments of the disclosure or the technical solutions of the prior art more clearly, the following will briefly introduce the attached drawings needed to be used in the embodiments or the description of the related art. Obviously, the attached drawings in the following description are only some of embodiments of the disclosure. For those skilled in the art, other drawings can be obtained according to the structure shown in these drawings without paying creative labor.

DESCRIPTION OF REFERENCE NUMERALS

Figure 1:
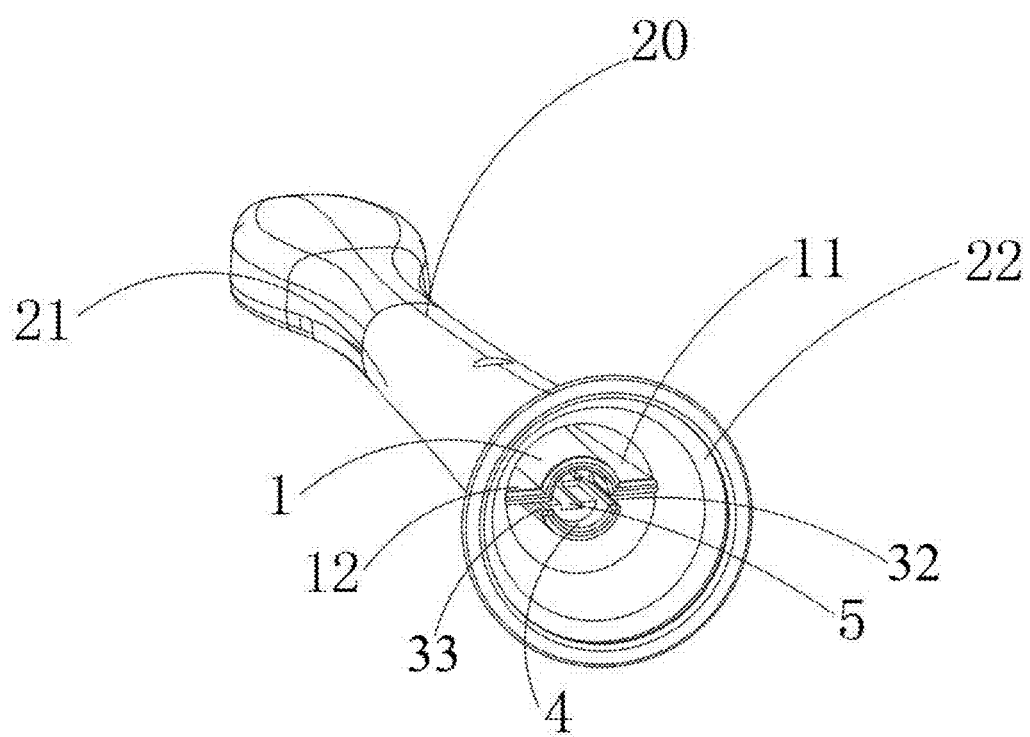
FIG. 1 is a schematic structural diagram of an electric toothbrush replacement head according to an embodiment of the disclosure.

1—transmission connecting part; 10—electric toothbrush; 11—first reinforced rib; 12—second reinforced rib;
20—replacement head; 21—replacement head handle; 22—opening;
30—electric toothbrush pole; 31—transmission shaft; 32—first through-groove; 33—second through-groove;
4—resilient structure;
5—transmission directional elongated groove; 51—first groove; 52—second groove;
6—third groove;
7—pressing platform;
8—space-keeping groove;
9—positioning groove.

A realization, functional features and advantages of the disclosure will be further described by combining with the embodiments of the disclosure and referring to the attached drawings of the disclosure.

DETAILED DESCRIPTION OF EMBODIMENTS

The technical solutions of the embodiments of the disclosure will be clearly and completely described below in combination with the attached drawings in the embodiments of the disclosure. Obviously, the described embodiments are only some embodiments of the disclosure and not all embodiments of the disclosure. Based on the embodiment of the disclosure, all other embodiments obtained by those skilled in the art without creative work belong to the protection scope of the disclosure.

It needs to explain that all directional indications (such as up, down, left, right, front, back . . . ) in the embodiments of the disclosure are only used to explain the relative position relations, motion conditions, etc. among the components in a particular attitude (as shown in the attached drawing), if the particular attitude changes, the directional indication changes accordingly.

In the disclosure, unless otherwise specified and limited, the terms "connected", "fixed", etc. shall be understood in a broad sense. For example, "fixed" may be a fixed connection, a detachable connection, or an integrated connection; it can be a mechanical connection or an electrical connection; it may be a direct connection or an indirect connection through an intermediate medium; it may be a connection between two elements or an interaction between two elements, unless otherwise specified. For those skilled in the art, the specific meaning of the above terms in the disclosure can be understood according to the specific circumstances.

In addition, if there is a description of "first", "second", etc., in the embodiments of the disclosure, the description of "first", "second", etc., is only used to describe purposes, cannot be understood as indicating or implying its relative importance or implicitly indicating the number of technical characteristics indicated. Thus, a feature defining "first" or "second" may include at least one of the features explicitly or implicitly. Additionally, the meaning of "and/or" in the full text, includes three parallel schemes, taking "A and/or B" as an example, including a scheme "A" or a scheme "B", or a scheme "A and B". In addition, the technical solutions between various embodiments may be combined with each other, but must be based on the achievement of those skilled in the art. When a combination of technical solutions appears contradictory or cannot be realized, the combination shall be considered not to exist and not to be within the protection scope of the disclosure.

The disclosure provides an electric toothbrush replacement head.

Embodiment 1

Figure 2:
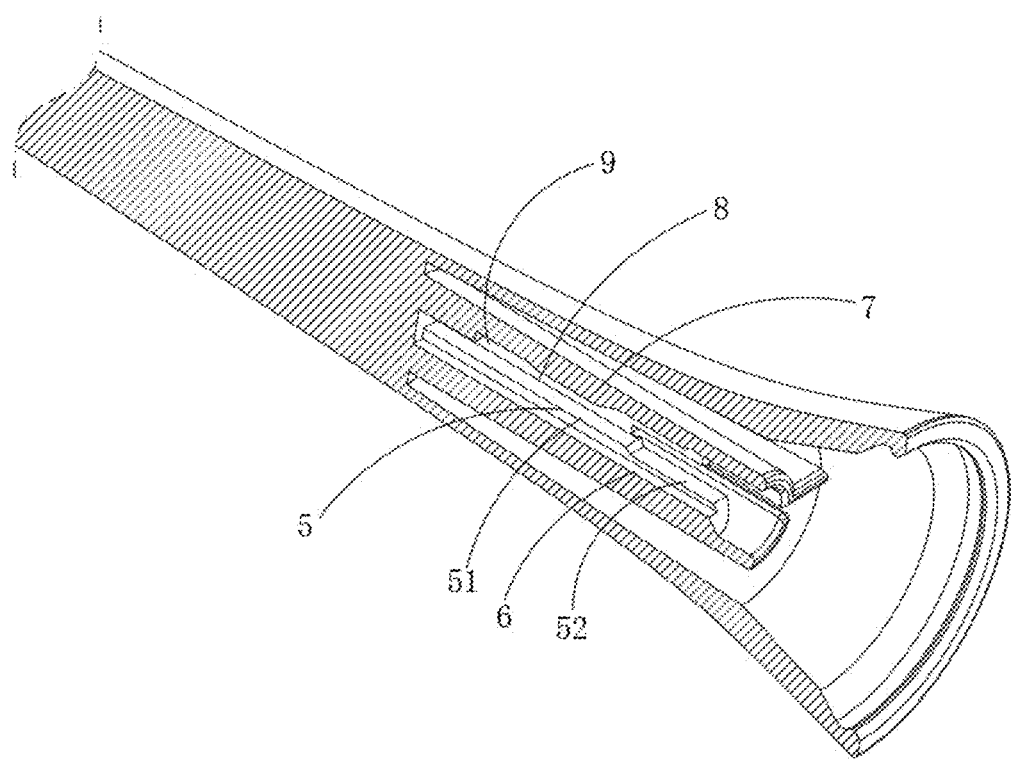
FIG. 2 is a sectional diagram of the electric toothbrush replacement head according to an embodiment of the disclosure.

Reference to FIG. 1 and FIG. 2, in an embodiment of the disclosure, an electric toothbrush replacement head 20 includes a replacement head handle 21, an end of which is provided with an opening 22. The opening 22 includes a transmission connecting part 1 therein, an edge of which is provided with at least one through-groove. In an illustrated embodiment of the disclosure, the edge of the transmission connecting part 1 comprises a first through-groove 32 and a second through-groove 33. The transmission connecting part 1 includes a transmission directional elongated groove 5 therein.

In an illustrated embodiment of the disclosure, a shape of the electric toothbrush replacement 20 is cylindrical. A shape of the opening 22 is cylindrical. A thickness of a portion where the replacement head handle 21 is provided with an opening 22 is at a range of 1.0 millimeters (mm) to 1.2 mm. Moreover, the first through-groove 32 is completely same with the second through-groove 33 in shape and size. A length of the first through-groove 32 is at a range of 8.0 mm to 8.5 mm, and the second through-groove 33 the same.

In an embodiment of the disclosure, at least one reinforced fib is provided between the transmission connecting part 1 and a portion where the replacement head handle 21 is provided with the opening 22. In an illustrated embodiment of the disclosure, a first reinforced rib 11 and a second reinforced rib 12 are provided between the transmission connecting part 1 and the portion where the replacement head handle 21 is provided with the opening 22.

In an embodiment of the disclosure, an outside of the transmission connecting part 1 comprises the first reinforced rib 11 and the second reinforced rib 12, which are used to strengthen a whole structure of the disclosure, as well as to transmit power.

Figure 4:
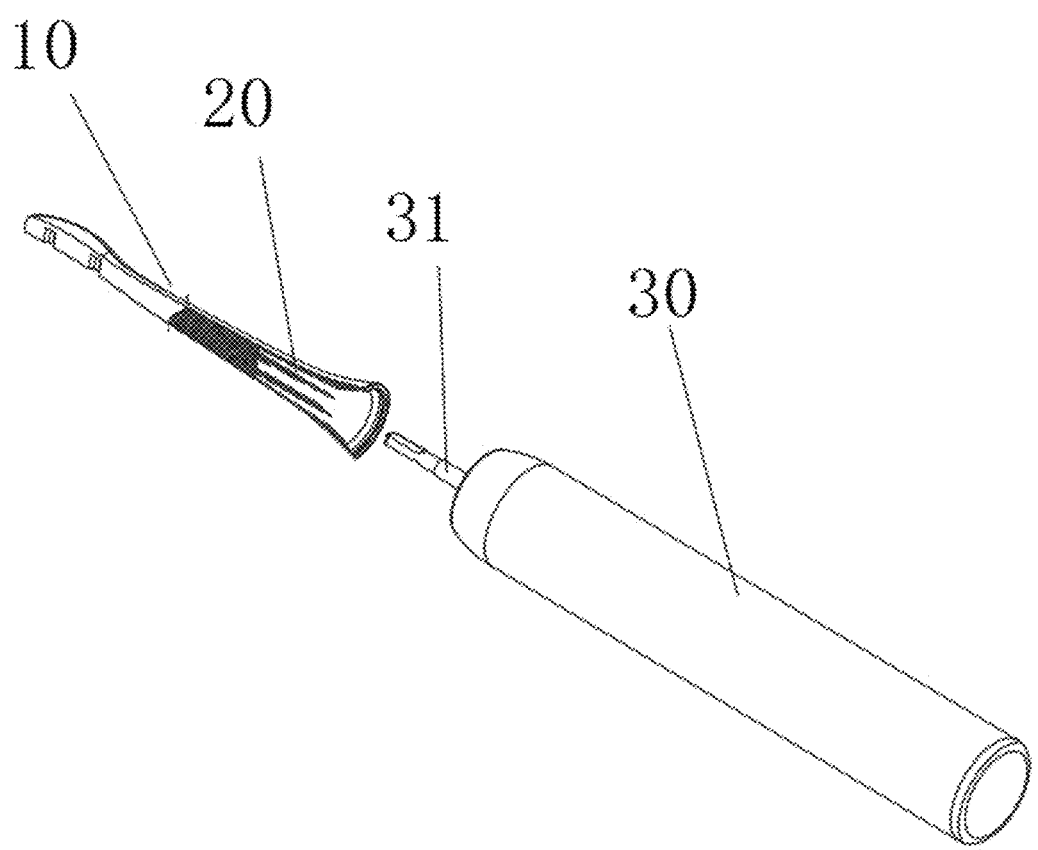
FIG. 4 is a schematic diagram of a disassembly of the electric toothbrush replacement head according to an embodiment of the disclosure.

Reference to FIG. 1 and FIG. 4, the first reinforced rib 11 and the second reinforced rib 12 are respectively provided with the first through-groove 32 and the second through-groove 33 on both sides. A resilient structure 4 is formed by the first through-groove 32, the second through-groove 33 and the transmission connecting part 1. An inner side of the resilient structure 4 includes a transmission shaft 31, which is disposed on the electric toothbrush pole 30, as well as the transmission directional elongated groove 5, which is completely fitted with the transmission shaft 31. The transmission shaft is used to transmit, and the transmission directional elongated groove 5 is used to deliver a vibration and a given direction.

Reference to FIG. 2, in an illustrated embodiment of the disclosure, the transmission directional elongated groove 5 includes two layers of grooves, which includes a first groove 51 and a second groove 52. A length of the first groove 51 is shorter than a length of the second groove 52. The first groove 51 is superimposed on the second groove 52.

In an embodiment of the disclosure, a clearance exists between the first groove 51 and the transmission shaft 31. In an illustrated embodiment of the disclosure, a contacting surface of the second groove 52 is approximately 11.5 mm, which is fitted with transmission shaft 31. Front sections of the first groove 51 and the second groove 52 are respectively provided with an inclined slope, which facilitates an installation of the transmission shaft 31.

In an illustrated embodiment of the disclosure, the transmission directional elongated groove 5 comprises a third groove 6.

In an embodiment of the disclosure, a middle side of the transmission directional elongated groove 5 includes the third groove 6, which can reduce a contact area between the transmission directional elongated groove 5 and the transmission shaft 31 to eliminate a difficulty on installing the transmission shaft 31. At the same time, the third groove is suitable for multi transmission shafts to promote an adaption.

In an illustrated embodiment of the disclosure, a pressing platform 7 is disposed on the transmission connecting part 1 and the pressing platform 7 is opposite to the transmission directional elongated groove 5.

In an embodiment of the disclosure, the pressing platform 7 is used to compress the transmission shaft 31 after the transmission shaft 31 being installed on the transmission directional elongated groove 5. The pressing platform 7 is suitable for a degree of tightness of the transmission shaft 31, which makes the transmission shaft 31 tightly fitted with the transmission directional elongated groove 5, and meanwhile deliver the vibration.

In an illustrated embodiment of the disclosure, the pressing platform 7 includes a space-keeping groove 8.

In an embodiment of the disclosure, the space-keeping groove 8 is disposed on an adjacent position of a front section of the pressing platform 7. In an illustrated embodiment of the disclosure, a position of the space-keeping groove 8 is at a range of 0.05 mm to 1 mm lower than a position of the pressing platform 7, which can facilitate an installation of the transmission shaft 31 to improve user experience.

In an illustrated embodiment of the disclosure, the space-keeping groove 8 includes a positioning groove 9.

In an embodiment of the disclosure, the positioning groove 9 is set on a front section of the space-keeping groove 8. The positioning groove 9 is used to control an inserting depth of the transmission shaft 31.

Figure 3:
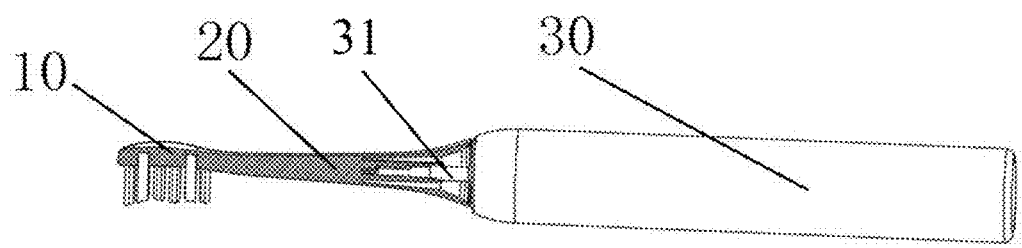
FIG. 3 is a schematic structural diagram of the electric toothbrush replacement head according to an embodiment of the disclosure.

Reference to FIG. 3 and FIG. 4, the electric toothbrush 10 of the disclosure includes the electric toothbrush replacement head 20 and the electric toothbrush pole 30; the transmission shaft 31 is disposed in the electric toothbrush pole 30. The electric toothbrush pole 30 is inserted into the transmission directional elongated groove 5 of the electric toothbrush replacement head 20 and is connected to the electric toothbrush 10 through the electric toothbrush replacement head 20.

In an embodiment of the disclosure, when installing the electric toothbrush replacement head 20, the transmission shaft 31 is firstly inserted into the transmission directional elongated groove 5 of the electric toothbrush replacement head 20; the resilient structure 4 will have a resilient action under a pressure of the transmission shaft 31 to facilitate the transmission shaft 31 installing.

The position of the second groove 52 of the transmission directional elongated groove 5 is lower than the position of the first groove 51. Therefore, when the transmission shaft 31 enters into the inclined slope of the front section of the second groove 52 of the transmission directional elongated groove 5, the transmission shaft 31 will slightly turn to a direction under effects of the inclined slop and the second groove 52 to make a surface of the transmission shaft 31 align with the contacting surface of the second groove 52, which can ensure bristles of the electric toothbrush replacement head 20 directly face to a front side of the electric toothbrush 10 and finish directional operation of first step.

When the transmission shaft 31 is inserted in a wrong direction, a directional plane of the transmission directional elongated groove 5 will form an interference with the transmission shaft 31 to refuse an insertion of the transmission shaft 31, which makes the user operate again to turn to another direction until that the insertion of the transmission shaft 31 is in a right direction.

The second groove 51 is disposed on the resilient structure 4. Therefore, the wrong operation of the user will cancel with a resilient force of the resilient structure 4, reducing damages to the electric toothbrush replacement head 20 and the transmission shaft 31.

The transmission shaft 31 tests a basic positioning of the contacting surface of the second groove 52 and inserts continuously. Then, the surface of the transmission shaft 31 will contact to a directional surface of the first groove 51. And the pressing platform 7 will compress a force to the transmission shaft 31 when the transmission shaft 31 passes through the pressing platform 7. Under the force of the pressing platform 7, the transmission shaft 31 is tightly fitted with the directional surface of the first groove 51, so the two surfaces are formed a hard connection.

Front section of the transmission shaft 31 is 0.1 mm larger than the shaft body of the transmission shaft 31. Therefore, the larger part of the transmission shaft 31 enters the space-keeping groove 8 after passing through the pressing platform 7 to reduce pressure between the transmission shaft 31 and the pressing platform 7, and release part of the pressure to facilitate the insertion. The transmission shaft 31 is abutted against the positioning groove 9. A top of the transmission shaft 31 is fitted with the positioning groove 9, which makes the transmission shaft 31 not insert continuously and stop at the positioning groove 9 and prevents the electric toothbrush replacement head 20 contacting to other parts of the body of the electric toothbrush 10 except the transmission shaft 31 of the electric toothbrush 10. After that, the installation of the electric toothbrush replacement head 20 has been finished.

In an embodiment of the disclosure, when the electric toothbrush replacement head 20 is in use, the electric toothbrush 10 starts running through a vibration generated by the transmission shaft 31. The vibration is transmitted to the transmission connecting part 1 through the transmission shaft 31 contacting to the transmission directional elongated groove 5 and the pressing platform 7. The transmission connecting part 1 is connected to the replacement head handle 21, and the opening 22 is connected to the reinforced ribs on both sides, which is used to deliver the vibration to the replacement head handle 21, then to the electric toothbrush replacement head 20 of the electric toothbrush 10. The bristles implanted on the electric toothbrush replacement head 20 vibrate at a set frequency to achieve a purpose of tooth cleaning under the operation of the electric toothbrush replacement head 20.

The disclosure can reduce components of the electric toothbrush replacement head, solve a loss of power while the transmission shaft passing through the basal plug, directly deliver the vibration, improve the cleaning effect and the service life of the electric toothbrush, eliminate the motor noise and is easy to use.

The above description is only the exemplary embodiments of the disclosure, but the protection scope of the disclosure is not limited to this. Any equivalent structural transformations made under the inventive concept of the present disclosure, using the contents of the specification of the present disclosure and the accompanying drawings, or applied directly/indirectly in other related fields of technology shall be included in the protection scope of the disclosure.

What is claimed is:

1. An electric toothbrush replacement head, comprising:
   a replacement head handle, wherein a distal end of the replacement head handle is provided with an opening, and a proximal end of the replacement head handle is provided with bristles;
   a transmission connecting part, disposed in the opening, wherein an edge of the transmission connecting part is provided with at least one through-groove and the transmission connecting part is provided with a transmission directional elongated groove therein;
   wherein two reinforced ribs are disposed in the opening and connected between the transmission connecting part and the replacement head handle, and a distal end of each of the two reinforced ribs is spaced inwardly away from the opening;

wherein the at least one through-groove comprises two through-grooves, the two through-grooves are defined on the transmission connecting part and located below the two reinforced ribs respectively, thereby a portion of the transmission connecting part disposed between the two through-grooves form a resilient structure disposed below the two reinforced ribs;

wherein the transmission directional elongated groove is configured to be in contact with a transmission shaft, a distal end of the transmission directional elongated groove is closer to the proximal end of the replacement head handle than the distal end of each of the reinforced ribs bristles, the transmission directional elongated groove comprises a first groove and a second groove, the first groove is superimposed on the second groove, a third groove is located at a middle side of the transmission directional elongated groove, an extension length of the first groove is less than that of the second groove, and the extension length of the second groove is the same as that of the third groove; and wherein the transmission connecting part is provided with a pressing platform faced to the transmission directional elongated groove, a space-keeping groove disposed on a front end of the pressing platform, and a positioning groove disposed on a front end of the space-keeping groove and configured to control an inserting depth of the transmission shaft.

2. The electric toothbrush replacement head according to claim 1, wherein the two through-grooves are the same in shape and size, and a length of each of the two through-grooves is at a range of 8.0 millimeters (mm) to 8.5 mm.

3. The electric toothbrush replacement head according to claim 1, wherein a position of the space-keeping groove is at a range of 0.05 mm to 1 mm lower than a position of the pressing platform.

4. The electric toothbrush replacement head according to claim 1, wherein the first groove is higher than that of a portion of the second groove which is not superimposed by the first groove, and the third groove is lower than the portion of the second groove which is not superimposed by the first groove.

5. The electric toothbrush replacement head according to claim 1, wherein a clearance is defined between the first groove and the transmission shaft, and the second groove is in contact with the transmission shaft.

6. The electric toothbrush replacement head according to claim 5, wherein a length of a contacting surface of the second groove is 11.5 mm, which is fitted with the transmission shaft.

7. The electric toothbrush replacement head according to claim 1, wherein the transmission shaft is abutted against the positioning groove, and an end of the transmission shaft is fitted with the positioning groove.

8. An electric toothbrush replacement head, comprising:
a replacement head handle, wherein the replacement head handle comprises an opening part defining an opening at a distal end, and a handle part at a proximal end connected to the opening part;
a transmission connecting part, connected to the handle part and disposed in the opening, wherein the transmission connecting part is provided with a first through-groove, a second through-groove, and a transmission directional elongated groove;

wherein the first through-groove and the second through-groove are disposed on two opposite sides of the transmission connecting part, and thereby the first through-groove, the second through-groove and the transmission connecting part together form a resilient structure;

wherein a third groove is located at a middle side of the transmission directional elongated groove, the transmission directional elongated groove is configured to be in contact with a transmission shaft, and comprises a first groove and a second groove; the third, the first groove, and the second groove each extend from a proximal end of the transmission connecting part; the first groove is superimposed on the second groove, and a length of the first groove is shorter than a length of the second groove, and a length of the third groove is the same as that of the second groove;

wherein the transmission connecting part is further provided with a pressing platform faced to the transmission directional elongated groove, and the pressing platform is configured to press the transmission shaft;

wherein two reinforced ribs are connected between the opening part and the transmission connecting part, a distal end of each of the two reinforced is spaced inwardly away from the opening, and a distal end of the transmission directional elongated groove is closer to the handle part than the distal end of each of the reinforced rib;

wherein the first through-groove and the second through-groove are defined on the transmission connecting part and disposed below the two reinforced ribs respectively, and the resilient structure is disposed below the two reinforced ribs; and wherein the transmission connecting part is further provided with a positioning groove located adjacent to an end of the pressing platform close to the handle part and configured to control an inserting depth of the transmission shaft.

9. The electric toothbrush replacement head according to claim 8, wherein the first groove is higher than that of a portion of the second groove which is not superimposed by the first groove, and the third groove is lower than the portion of the second groove which is not superimposed by the first groove.

10. The electric toothbrush replacement head according to claim 8, wherein a clearance is defined between the first groove and the transmission shaft, and the second groove is in contact with the transmission shaft.

11. The electric toothbrush replacement head according to claim 10, wherein a length of a contacting surface of the second groove is 11.5 mm, which is fitted with the transmission shaft.

12. The electric toothbrush replacement head according to claim 11, wherein a thickness of the opening part is at a range of 1.0 mm to 1.2 mm; the first through-groove is the same with the second through-groove in shape and size, and a length of each of the first through-groove and the second through-groove is at a range of 8.0 mm to 8.5 mm.

13. The electric toothbrush replacement head according to claim 8, wherein the transmission shaft is abutted against the positioning groove, and an end of the transmission shaft is fitted with the positioning groove.

* * * * *